（12）United States Patent
Raichelgauz et al.

(10) Patent No.: US 11,904,863 B2
(45) Date of Patent: Feb. 20, 2024

(54) PASSING A CURVE

(71) Applicant: CARTICA AI LTD, Tel Aviv (IL)

(72) Inventors: Igal Raichelgauz, Tel Aviv (IL); Karina Odinaev, Tel Aviv (IL)

(73) Assignee: Autobrains Technologies Ltd., Tel Aviv-Jaffa (IL)

( * ) Notice: Subject to any disclaimer, the term of this patent is extended or adjusted under 35 U.S.C. 154(b) by 0 days.

(21) Appl. No.: 16/946,192

(22) Filed: Jun. 9, 2020

(65) Prior Publication Data

US 2020/0298864 A1 Sep. 24, 2020

Related U.S. Application Data

(63) Continuation-in-part of application No. 16/544,940, filed on Aug. 20, 2019, and a continuation-in-part of
(Continued)

(51) Int. Cl.
*B60W 40/06* (2012.01)
*B60W 50/14* (2020.01)
*G05D 1/02* (2020.01)
*B60W 60/00* (2020.01)
*G05D 1/00* (2006.01)

(52) U.S. Cl.
CPC ............ *B60W 40/06* (2013.01); *B60W 50/14* (2013.01); *B60W 60/00184* (2020.02); *G05D 1/0274* (2013.01); *B60W 2556/50* (2020.02)

(58) Field of Classification Search
CPC .. G06K 9/6262; G06K 9/4642; G06K 9/6228; B60W 40/06; B60W 50/14; B60W 60/00184; B60W 2556/50; G05D 1/0274
See application file for complete search history.

(56) References Cited

U.S. PATENT DOCUMENTS 6,640,015 B1  10/2003  Lafruit
7,801,893 B2   9/2010  Gulli
(Continued)

FOREIGN PATENT DOCUMENTS

DE   102012009297 A1   12/2012
DE   102016122686 A1    5/2018

OTHER PUBLICATIONS

Jasinschi et al., A Probabilistic Layered Framework for Integrating Multimedia Content and Context Information, 2002, IEEE, p. 2057-2060. (Year: 2002).
(Continued)

*Primary Examiner* — Ruiping Li
(74) *Attorney, Agent, or Firm* — Reches Patents

(57) ABSTRACT

A method for passing a curve, the method may include sensing, by a vehicle sensor, environment information regarding an environment of the vehicle; sensing at least one current propagation parameter of the vehicle; detecting, based on at least the environment information, (a) that the vehicle is about to reach the curve, (b) one or more first road conditions of a first road segment that precedes the curve; determining one or more curve passing propagation parameters to be applied by the vehicle while passing the curve, wherein the determining is based, at least in part, on the one or more first road conditions and on the at least one current propagation parameter; and responding to the determining.

23 Claims, 8 Drawing Sheets

Related U.S. Application Data application No. 16/544,942, filed on Aug. 20, 2019, and a continuation-in-part of application No. 16/542,327, filed on Aug. 16, 2019, now Pat. No. 10,748,038.

(60) Provisional application No. 62/859,120, filed on Jun. 9, 2019, provisional application No. 62/827,112, filed on Mar. 31, 2019, provisional application No. 62/750,822, filed on Oct. 26, 2018.

(56) References Cited

U.S. PATENT DOCUMENTS

| | | |
|---|---|---|
| 8,275,764 B2 | 9/2012 | Jeon |
| RE44,225 E | 5/2013 | Aviv |
| 8,527,978 B1 | 9/2013 | Sallam |
| 8,634,980 B1 | 1/2014 | Urmson |
| 8,781,152 B2 | 7/2014 | Momeyer |
| 8,782,077 B1 | 7/2014 | Rowley |
| 9,298,763 B1 | 3/2016 | Zack |
| 9,416,499 B2 | 8/2016 | Cronin et al. |
| 9,440,647 B1 | 9/2016 | Sucan |
| 9,734,533 B1 | 8/2017 | Givot |
| 9,863,928 B1 | 1/2018 | Peterson et al. |
| 9,953,535 B1 | 4/2018 | Canavor et al. |
| 9,983,013 B1* | 5/2018 | Krunic ............... G01C 21/3697 |
| 10,048,700 B1 | 8/2018 | Curlander et al. |
| 10,133,947 B2 | 11/2018 | Yang |
| 10,347,122 B2 | 7/2019 | Takenaka |
| 10,491,885 B1 | 11/2019 | Hicks |
| 2003/0037010 A1 | 2/2003 | Schmelzer |
| 2004/0059736 A1 | 3/2004 | Willse |
| 2004/0091111 A1 | 5/2004 | Levy |
| 2004/0230572 A1 | 11/2004 | Omoigui |
| 2005/0193015 A1 | 9/2005 | Logston |
| 2006/0100987 A1 | 5/2006 | Leurs |
| 2006/0120626 A1 | 6/2006 | Perlmutter |
| 2006/0251339 A1 | 11/2006 | Gokturk |
| 2007/0196013 A1 | 8/2007 | Li |
| 2008/0109433 A1 | 5/2008 | Rose |
| 2008/0152231 A1 | 6/2008 | Gokturk |
| 2008/0166020 A1 | 7/2008 | Kosaka |
| 2008/0270569 A1 | 10/2008 | McBride |
| 2008/0294278 A1 | 11/2008 | Borgeson |
| 2009/0022472 A1 | 1/2009 | Bronstein |
| 2009/0034791 A1 | 2/2009 | Doretto |
| 2009/0043818 A1 | 2/2009 | Raichelgauz |
| 2009/0080759 A1 | 3/2009 | Bhaskar |
| 2009/0216761 A1 | 8/2009 | Raichelgauz |
| 2009/0278934 A1 | 11/2009 | Ecker |
| 2010/0042646 A1 | 2/2010 | Raichelqauz |
| 2010/0082684 A1 | 4/2010 | Churchill |
| 2010/0111408 A1 | 5/2010 | Matsuhira |
| 2010/0306193 A1 | 12/2010 | Pereira |
| 2011/0029620 A1 | 2/2011 | Bonforte |
| 2011/0038545 A1 | 2/2011 | Bober |
| 2011/0190972 A1 | 8/2011 | Timmons et al. |
| 2011/0246566 A1 | 10/2011 | Kashef |
| 2012/0133497 A1 | 5/2012 | Sasaki |
| 2012/0179751 A1 | 7/2012 | Ahn |
| 2013/0103814 A1 | 4/2013 | Carrasco |
| 2013/0212493 A1 | 8/2013 | Krishnamurthy |
| 2013/0226820 A1 | 8/2013 | Sedota, Jr. |
| 2014/0025692 A1 | 1/2014 | Pappas |
| 2014/0059443 A1 | 2/2014 | Tabe |
| 2014/0095425 A1 | 4/2014 | Sipple |
| 2014/0111647 A1 | 4/2014 | Atsmon |
| 2014/0201330 A1 | 7/2014 | Lozano Lopez |
| 2014/0379477 A1 | 12/2014 | Sheinfeld |
| 2015/0033150 A1 | 1/2015 | Lee |
| 2015/0117784 A1 | 4/2015 | Lin |
| 2015/0134688 A1 | 5/2015 | Jing |
| 2015/0153735 A1* | 6/2015 | Clarke ................. B62D 15/025 701/301 |
| 2015/0224988 A1 | 8/2015 | Buerkle et al. |
| 2015/0363644 A1 | 12/2015 | Wnuk |
| 2016/0133130 A1 | 5/2016 | Grimm et al. |
| 2016/0210525 A1 | 7/2016 | Yang |
| 2016/0221592 A1 | 8/2016 | Puttagunta |
| 2016/0302046 A1 | 10/2016 | Velusamy |
| 2016/0330394 A1 | 11/2016 | Shahraray et al. |
| 2016/0342683 A1 | 11/2016 | Kwon |
| 2016/0357188 A1 | 12/2016 | Ansari |
| 2017/0007521 A1 | 1/2017 | Monsonis et al. |
| 2017/0008521 A1 | 1/2017 | Braunstein et al. |
| 2017/0010618 A1* | 1/2017 | Shashua ............. G01C 21/3644 |
| 2017/0032257 A1 | 2/2017 | Sharifi |
| 2017/0041254 A1 | 2/2017 | Agara Venkatesha Rao |
| 2017/0072851 A1 | 3/2017 | Shenoy et al. |
| 2017/0109602 A1 | 4/2017 | Kim |
| 2017/0136842 A1 | 5/2017 | Anderson et al. |
| 2017/0243370 A1 | 8/2017 | Hoye et al. |
| 2017/0255620 A1 | 9/2017 | Raichelgauz |
| 2017/0262437 A1 | 9/2017 | Raichelgauz |
| 2017/0297401 A1 | 10/2017 | Hrovat et al. |
| 2017/0323568 A1 | 11/2017 | Inoue |
| 2018/0081368 A1 | 3/2018 | Watanabe |
| 2018/0101177 A1 | 4/2018 | Cohen |
| 2018/0157916 A1 | 6/2018 | Doumbouya |
| 2018/0158323 A1 | 6/2018 | Takenaka |
| 2018/0204111 A1 | 7/2018 | Zadeh |
| 2019/0005726 A1 | 1/2019 | Nakano |
| 2019/0039627 A1 | 2/2019 | Yamamoto |
| 2019/0043274 A1 | 2/2019 | Hayakawa |
| 2019/0045244 A1 | 2/2019 | Balakrishnan |
| 2019/0056718 A1 | 2/2019 | Satou |
| 2019/0065951 A1 | 2/2019 | Luo |
| 2019/0088135 A1 | 3/2019 | Do et al. |
| 2019/0188501 A1 | 6/2019 | Ryu |
| 2019/0220011 A1 | 7/2019 | Della Penna |
| 2019/0317513 A1 | 10/2019 | Zhang |
| 2019/0364492 A1 | 11/2019 | Azizi |
| 2019/0384303 A1 | 12/2019 | Muller |
| 2019/0384312 A1 | 12/2019 | Herbach |
| 2019/0385460 A1 | 12/2019 | Magzimof |
| 2019/0389459 A1 | 12/2019 | Berntorp |
| 2020/0004248 A1 | 1/2020 | Healey |
| 2020/0004251 A1 | 1/2020 | Zhu |
| 2020/0004265 A1 | 1/2020 | Zhu |
| 2020/0005631 A1 | 1/2020 | Visintainer |
| 2020/0018606 A1 | 1/2020 | Wolcott |
| 2020/0018618 A1 | 1/2020 | Ozog |
| 2020/0020212 A1 | 1/2020 | Song |
| 2020/0050973 A1 | 2/2020 | Stenneth |
| 2020/0073977 A1 | 3/2020 | Montemerlo |
| 2020/0090484 A1 | 3/2020 | Chen |
| 2020/0097756 A1 | 3/2020 | Hashimoto |
| 2020/0133307 A1 | 4/2020 | Kelkar |
| 2020/0043326 A1 | 6/2020 | Tao |
| 2020/0269864 A1 | 8/2020 | Zhang et al. |
| 2020/0324778 A1 | 10/2020 | Diamond et al. |
| 2020/0406925 A1* | 12/2020 | Du ................... B60W 60/0013 |
| 2022/0005291 A1 | 1/2022 | Konrardy et al. |

OTHER PUBLICATIONS

Jones et al., "Contextual Dynamics of Group-Based Sharing Decisions", 2011, University of Bath, p. 1777-1786. (Year: 2011).

Iwamoto, "Image Signature Robust To Caption Superimpostion for Video Sequence Identification", IEEE, pp. 3185-3188 (Year: 2006).

Cooperative Multi-Scale Convolutional Neural, Networks for Person Detection, Markus Eisenbach, Daniel Seichter, Tim Wengefeld, and Horst-Michael Gross Ilmenau University of Technology, Neuroinformatics and Cognitive Robotics Lab (Year: 2016).

Chen, Yixin, James Ze Wang, and Robert Krovetz. "CLUE: cluster-based retrieval of images by unsupervised learning." IEEE transactions on Image Processing 14.8 (2005): 1187-1201. (Year: 2005).

Wusk et al (Non-Invasive detection of Respiration and Heart Rate with a Vehicle Seat Sensor; www.mdpi.com/journal/sensors; Published: May 8, 2018). (Year: 2018).

Chen, Tiffany Yu-Han, et al. "Glimpse: Continuous, real-time object recognition on mobile devices." Proceedings of the 13th ACM

(56) References Cited

OTHER PUBLICATIONS

Confrecene on Embedded Networked Sensor Systems. 2015. (Year: 2015).

* cited by examiner

PASSING A CURVE

CROSS REFERENCE

This application claims priority from U.S. provisional patent Ser. No. 62/859,120 filing date Jun. 9, 2019 which is incorporated herein by reference.

This application is a continuation in part of U.S. patent application Ser. No. 16/544,942 filing date Aug. 20, 2019 which is incorporated herein by reference.

This application is a continuation in part of U.S. patent application Ser. No. 16/542,327 filing date Aug. 16, 2019 which is incorporated herein by reference.

This application is a continuation in part of U.S. patent application Ser. No. 16/544,940 filing date Aug. 202, 2019 which is incorporated herein by reference.

BACKGROUND

There are more accidents in curved sections of a road (hereinafter "curves") than in straight sections of a road.

There is a growing need to provide an efficient method for reducing accidents that occur when driving in such curves.

SUMMARY

There may be provided a non-transitory computer readable medium for passing a curve, the non-transitory computer readable medium that may store instructions for sensing, by a vehicle sensor, environment information regarding an environment of the vehicle (for example—acquiring one or more images and/or acquiring non-visual information about the environment); sensing at least one current propagation parameter of the vehicle; detecting, based on at least the environment information, (a) that the vehicle is about to reach the curve, (b) one or more first road conditions of a first road segment that precedes the curve; determining one or more curve passing propagation parameters to be applied by the vehicle while passing the curve, wherein the determining is based, at least in part, on the one or more first road conditions and on the at least one current propagation parameter; and responding to the determining.

There may be provided a method for passing a curve, the method may include sensing, by a vehicle sensor, environment information regarding an environment of the vehicle (for example—acquiring one or more images and/or acquiring non-visual information about the environment); sensing at least one current propagation parameter of the vehicle; detecting, based on at least the environment information, (a) that the vehicle is about to reach the curve, (b) one or more first road conditions of a first road segment that precedes the curve; determining one or more curve passing propagation parameters to be applied by the vehicle while passing the curve, wherein the determining is based, at least in part, on the one or more first road conditions and on the at least one current propagation parameter; and responding to the determining.

The method may include receiving or generating a mapping between values of the one or more first road conditions and values of the one or more curve passing propagation parameters.

The determining is further responsive to the mapping.

The method may include receiving one or more second road conditions of a road second road segment that starts after a beginning of the curve.

The determining is further responsive to the one or more second road conditions.

The method may include receiving the one or more second road conditions from another vehicle.

The determining is further responsive to a mapping between (a) values of the first one or more road conditions, values of the second one or more road conditions, and (b) values of the one or more curve passing propagation parameters.

The responding comprises performing an advance driver assistance system (ADAS) operation that involves informing a driver of the vehicle about values of the one or more curve passing propagation parameters.

The responding comprises applying an autonomous vehicle pattern that involves applying the one or more curve passing propagation parameters.

The method may include transmitting the one or more first road conditions of a first road segment that precedes the curve to another vehicle.

BRIEF DESCRIPTION OF THE DRAWINGS

The embodiments of the disclosure will be understood and appreciated more fully from the following detailed description, taken in conjunction with the drawings in which.

DETAILED DESCRIPTION OF THE DRAWINGS

Figure 1:
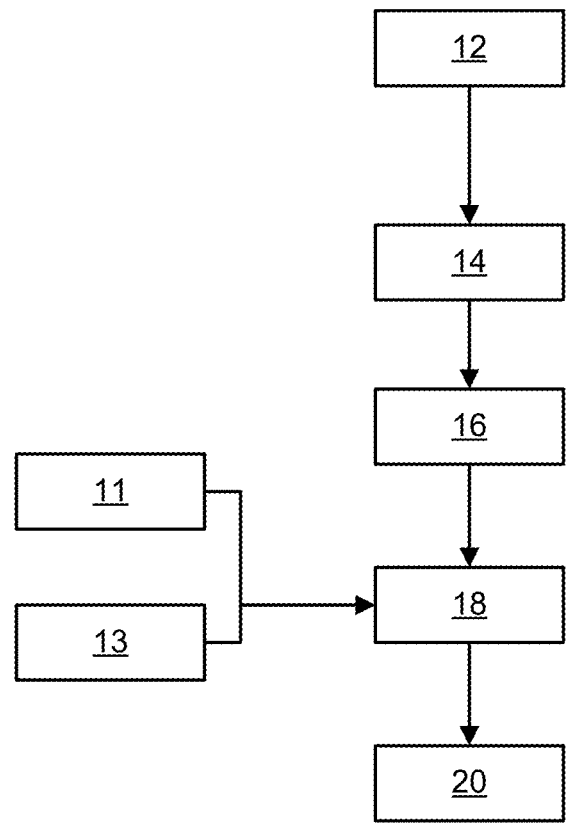
FIG. 1 is an example of a method.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to an image. An image is an example of a media unit. Any reference to an image may be applied mutatis mutandis to a media unit. A media unit may be an example of sensed information. Any reference to a media unit may be applied mutatis mutandis to any type of natural signal such as but not limited to signal generated by nature, signal representing human behavior, signal representing operations related to the stock market, a medical signal, financial series, geodetic signals, geophysical, chemical, molecular, textual and numerical signals, time series, and the like. Any reference to a media unit may be applied mutatis mutandis to sensed information. The sensed information may be of any kind and may be sensed by any type of sensors—such as a visual light camera, an audio sensor, a sensor that may sense infrared, radar imagery, ultrasound, electro-optics, radiography, LIDAR (light detection and ranging), etc. The sensing may include generating samples (for example, pixel, audio signals) that represent the signal that was transmitted, or otherwise reach the sensor.

The specification and/or drawings may refer to a spanning element. A spanning element may be implemented in software or hardware. Different spanning element of a certain iteration are configured to apply different mathematical functions on the input they receive. Non-limiting examples of the mathematical functions include filtering, although other functions may be applied.

The specification and/or drawings may refer to a concept structure. A concept structure may include one or more clusters. Each cluster may include signatures and related metadata. Each reference to one or more clusters may be applicable to a reference to a concept structure.

The specification and/or drawings may refer to a processor. The processor may be a processing circuitry. The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any claims may be provided.

Any combinations of systems, units, components, processors, sensors, illustrated in the specification and/or drawings may be provided.

Any reference to an object may be applicable to a pattern. Accordingly—any reference to object detection is applicable mutatis mutandis to a pattern detection.

The term "and/or" is additionally or alternatively.

FIG. 1 illustrates a method 10 passing a curve.

Method 10 may include steps 12 and 14.

Step 12 may include sensing, by a vehicle sensor, environment information regarding an environment of the vehicle (for example—acquiring one or more images and/or acquiring non-visual information about the environment). The vehicle sensor may be any of the mentioned above sensors and it may generate images or any other media unit or any other sensed information.

An environment of the vehicle may include any content included within the field of view of the sensor which is within a predefined distance from the vehicle—for example—between 1 and 100 meter, between 0.1 and 50 meters, below a kilometer, and the like.

Step 12 may be executed by more than a single sensor.

Step 14 may include sensing at least one current propagation parameter of the vehicle. The current propagation parameter may be speed, acceleration, propagation path, and the like.

Step 12 and 14 may be followed by step 16 of detecting, based on at least the environment information, (a) that the vehicle is about to reach the curve, (b) one or more first road conditions of a first road segment that precedes the curve.

The first road conditions may include the curvature, height difference, presence of obstacles, wetness, quality of road, materials of the road, rigidness of the road, whether the road upper surface is scrapped, smooth and the like.

Additionally or alternatively, the reaching of a curve may be determined using the location of the vehicle and the (known) location of curves at the vicinity of the vehicle.

Step 16 may include searching for a sensed information signature that is indictive of the curve. The sensed information signature may be generated in various manner—see for example U.S. patent application Ser. No. 16/542,327 filing date Aug. 16, 2019 which is incorporated herein by reference, and U.S. patent application Ser. No. 16/544,942 filing date Aug. 20, 2019 which is incorporated herein by reference.

Step 16 may be followed by step 18 of determining one or more curve passing propagation parameters to be applied by the vehicle while passing the curve, wherein the determining is based, at least in part, on the one or more first road conditions and on the at least one current propagation parameter.

The one or more curve passing propagation parameters may include speed, acceleration and a propagation path to be followed in the curve, and the like.

Method 10 may include step 11 of receiving or generating a mapping between values of the one or more first road conditions and values of the one or more curve passing propagation parameters.

The values of the one or more curve passing propagation parameters may be values that are expected to guarantee a safe passing of the curve and/or a passage that is deemed to be safe by the driver and/or by the passenger.

Method 10 may include step 13 of receiving one or more second road conditions of a road second road segment that starts after a beginning of the curve.

Step 13 may include receiving the one or more second road conditions from another vehicle or from an entity that is not a vehicle (for example a static camera, an unmanned airborne device, and the like), using Car-to-X communication (X may be another car or any other device), and the like.

The second road conditions may or may not be visible to the vehicle (before reaching the curve) and thus may provide highly beneficial information to the determining.

Step 18 may be responsive to the mapping received or generated in step 11. Additionally or alternatively, step 18 may be responsive to the one or more second road conditions.

Step 18 may be followed by step 20 of responding to the determining.

Step 20 may include performing an advance driver assistance system (ADAS) operation (which is an operation that assists a human driver—for example y without autonomously controlling the vehicle) that involves informing a driver of the vehicle about values of the one or more curve passing propagation parameters. It should be noted that an ADAS operation may involve taking over control of the vehicle from the driver (for example when a critical situation is detected), autonomously slowing down the vehicle, autonomously imposing limitations on the driving of the vehicle (for example limiting a maximal acceleration and/or limiting maximal velocity, and the like.

Step 20 may include applying an autonomous vehicle pattern that involves applying the one or more curve passing propagation parameters.

Step 20 may include transmitting the one or more first road conditions of a first road segment that precedes the curve to another vehicle or to a third entity that is not a vehicle.

Figure 2:
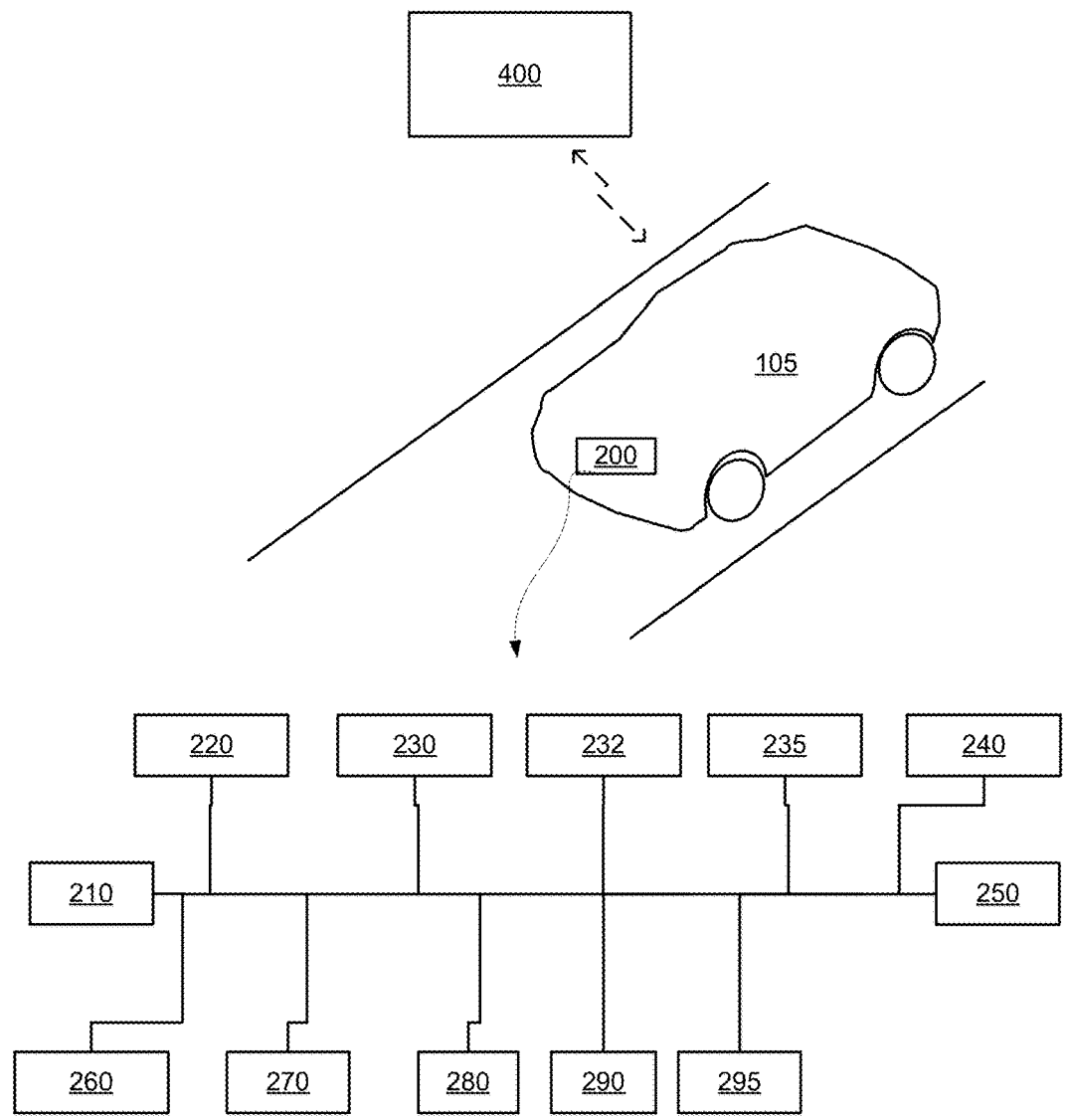
FIG. 2 is an example of a vehicle and its environment.

FIG. 2 illustrates a vehicle 105 that includes a driving system 200 (hereinafter also referred to as system 200), constructed and implemented in accordance with embodiments described herein.

Driving system 200 may include processing circuitry 210, input/output (I/O) module 220, an image sensor 230, a non-imaging sensor 232, speed sensor 235, accelerometer 250, telemetry ECU 240, autonomous driving manager 260, database 270, an advance driving assistance (ADAS) manager 280, curve passage determination module 290, and curve identification module 295.

The database 270 may store at least one out of (a) one or more first road conditions, (b) one or more curve passing propagation parameters, (c) at least one current propagation parameter of the vehicle, (d) environment information, one or more second road conditions of a road second road segment that starts after a beginning of the curve, and (e) a mapping between any combination or sub-combinations of (a), (b), (c) and (d).

The mapping may include any form of instructions, tables, pseudo-code and the like that links any combination or sub-combinations of (a), (b), (c) and (d).

It should be noted that the vehicle may include (a) other systems or modules or units and/or (b) additional systems or modules or units, (c) and/or fewer systems or modules or units. For example—vehicle 105 may include only one out of autonomous driving manager 260 and ADAS manager 280.

Autonomous driving manager 260 may be instantiated in a suitable memory for storing software such as, for example, an optical storage medium, a magnetic storage medium, an electronic storage medium, and/or a combination thereof. It will be appreciated that system 200 may be implemented as an integrated component of an onboard computer system in a vehicle. Alternatively, system 200 may be implemented and a separate component in communication with the onboard computer system. It will also be appreciated that in the interests of clarity, while system 200 may comprise additional components and/or functionality e.g., for autonomous driving of vehicle 105, such additional components and/or functionality are not depicted in FIG. 9 and/or described herein.

Processing circuitry 210 may be operative to execute instructions stored in memory (not shown). For example, processing circuitry 210 may be operative to execute autonomous driving manager 260 and/or may be operative to execute mapping generator 290 and/or may be operative to execute ADAS manager 280 and/or may operable to execute the curve passage determination module 290 and/or may be operable to execute the curve identification module 295.

It will be appreciated that processing circuitry 210 may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits. It will similarly be appreciated that system 200 may comprise more than one instance of processing circuitry 210. For example, one such instance of processing circuitry 210 may be a special purpose processor operative to execute autonomous driving manager 260 to perform some, or all, of the functionality of system 200 as described herein.

I/O module 220 may be any suitable communications component such as a network interface card, universal serial bus (USB) port, disk reader, modem or transceiver that may be operative to use protocols such as are known in the art to communicate either directly, or indirectly, with other elements, such as, for example, system 400, image sensor 230, a non-imaging sensor 232, speed sensor 235, telemetry ECU 240, and/or accelerometer 250. As such, I/O module 220 may be operative to use a wired or wireless connection to connect to system 400 via a communications network such as a local area network, a backbone network and/or the Internet, etc. I/O module 220 may also be operative to use a wired or wireless connection to connect to other components of system 200, e.g., image sensor 230, a non-imaging sensor 232, speed sensor 235, accelerometer 250, telemetry ECU 240, any other sensor, and the like. It will be appreciated that in operation I/O module 220 may be implemented as a multiplicity of modules, where different modules may be operative to use different communication technologies. For example, a module providing mobile network connectivity may be used to connect to system 400, whereas a local area wired connection may be used to connect to image sensor 230, a non-imaging sensor 232, speed sensor 235, accelerometer 250.

In accordance with embodiments described herein, image sensor 230, a non-imaging sensor 232, speed sensor 235, telemetry ECU 240, and accelerometer 250 represent implementations of sensor(s). It will be appreciated that image sensor 230, a non-imaging sensor 232, speed sensor 235, telemetry ECU 240, and accelerometer 250 may be implemented as integrated components of vehicle 105 and may provide other functionality that is the interests of clarity is not explicitly described herein. As described hereinbelow, system 200 may use environment information (information about a current driving environment) as received from image sensor 230, a non-imaging sensor 232, speed sensor 235, telemetry ECU 240, and accelerometer 250.

Autonomous driving manager 260 may be an application implemented in hardware, firmware, or software that may be executed by processing circuitry 210 to provide driving instructions to vehicle 105. For example, autonomous driving manager 260 may use images received from image sensor 230 and/or telemetry data received from telemetry ECU 240 to determine an appropriate driving policy for arriving at a given destination and provide driving instructions to vehicle 105 accordingly. It will be appreciated that autonomous driving manager 260 may also be operative to use other data sources when determining a driving policy, e.g., maps of potential routes, traffic congestion reports, etc.

ADAS manager 280 may be an application implemented in hardware, firmware, or software that may be executed by processing circuitry 210 to assist a driver in driving the vehicle 105. The ADAS manager may assist the driver in any manner known in the art—for example—plan a suggested driving path, provide collision alerts, obstacle alerts, cross lane alerts, and the like. The ADAS manager 280 may provide indication to a driver (either upon request or else) about the passing propagation parameters to be applied by the vehicle while passing the curve.

Curve passage determination module 290 is configured to determine one or more curve passing propagation parameters to be applied by the vehicle while passing the curve, wherein the determining is based, at least in part, on the one or more first road conditions and on the at least one current propagation parameter.

Curve identification module 295 is configured to detect, based on at least the environment information that the vehicle is about to reach the curve.

Figure 3:
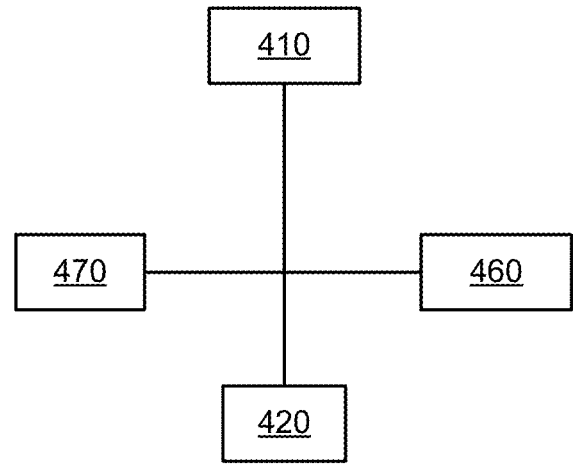
FIG. 3 is an example of a system

Reference is now made to FIG. 3 which is a block diagram of system 400 (such as a server, multiple servers), constructed and implemented in accordance with embodiments described herein. System 400 may include processing circuitry 410, input/output (I/O) module 420, mapping generator 460, and database 470.

The mapping generator 460 may be instantiated in a suitable memory for storing software such as, for example, an optical storage medium, a magnetic storage medium, an electronic storage medium, and/or a combination thereof.

Processing circuitry 410 may be operative to execute instructions stored in memory (not shown). For example, processing circuitry 410 may be operative to execute mapping generator 460. It will be appreciated that processing circuitry 410 may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits. It will similarly be appreciated that server 400 may comprise more than one instance of processing circuitry 410. For example, one such instance of processing circuitry 410 may be a special purpose processor operative to execute mapping generator 460 to perform some, or all, of the functionality of server 400 as described herein.

I/O module 420 may be any suitable communications component such as a network interface card, universal serial bus (USB) port, disk reader, modem or transceiver that may be operative to use protocols such as are known in the art to communicate either directly, or indirectly, with system 200. As such, I/O module 420 may be operative to use a wired or wireless connection to connect to system 200 via a communications network such as a local area network, a backbone network and/or the Internet, etc. It will be appreciated that in operation I/O module 420 may be implemented as a multiplicity of modules, where different modules may be operative to use different communication technologies. For example, a module providing mobile network connectivity may be used to connect wirelessly to one instance of system 200, e.g., one vehicle 105, whereas a local area wired connection may be used to connect to a different instance of system 100, e.g., a different vehicle 105.

Mapping generator 460 may be an application implemented in hardware, firmware, or software that may be executed by processing circuitry 410 to generate any of the mentioned above mappings. For example, mapping generator 460 may use any sensed information from any sensor of any vehicle to determine any of the mentioned mappings, based on information sensed during, before or after the passage of one or more curves by one or more vehicles. The mapping generator 400 may determine in a supervised and/or unsupervised which values of curve passing propagation parameters resulted in a successful passage of a curve, which results in accidents, which resulted in near accidents and the like.

The mapping generator may receive at least one out of:
Sensed information.
Information regarding an environment of one or more vehicles before reaching one or more curves.
Information regarding an environment of the one or more vehicles during the passage of the one or more curves.
Information regarding an environment of the one or more vehicles after passing the one or more curves.
Information regarding propagation parameters of the one or more vehicles before reaching the one or more curves.
Information regarding propagation parameters of the one or more vehicles during passage of the one or more curves.
Information regarding propagation parameters of the one or more vehicles.
Information regarding propagation parameters of the one or more vehicles after passing the one or more curves.
Information about obstacles in the one or more curves.
Information about obstacles before and/or after the one or more curves.
Information about a reaction of the driver and/or a passenger to a passage of the one or more curves).

The information may be provided by the one or more vehicles, by one or more drivers and/or passengers of the one or more vehicles, by third parties, and the like.

The mapping generator may generate the mapping in various manners, for example by applying one or more machine learning processes.

FIGS. 3, 4, 5, 6, 7 and 8 illustrate various example of a first vehicle 81 that propagates along a road at a first part 101 that precedes curve 102, passes the curve 102, and exits the curve (drives over an additional part 102 of the road. First vehicle 81 follows a path 91.

Path 91, or at least a part of the path 91 (especially the part of the path that passes curve 102) may be determined based on curve passing propagation parameters.

The path 91 may be an autonomous driving path of an autonomous vehicle, may be a driving path that is suggested by an ADAS module and followed by a driver, and the like.

Figure 6:
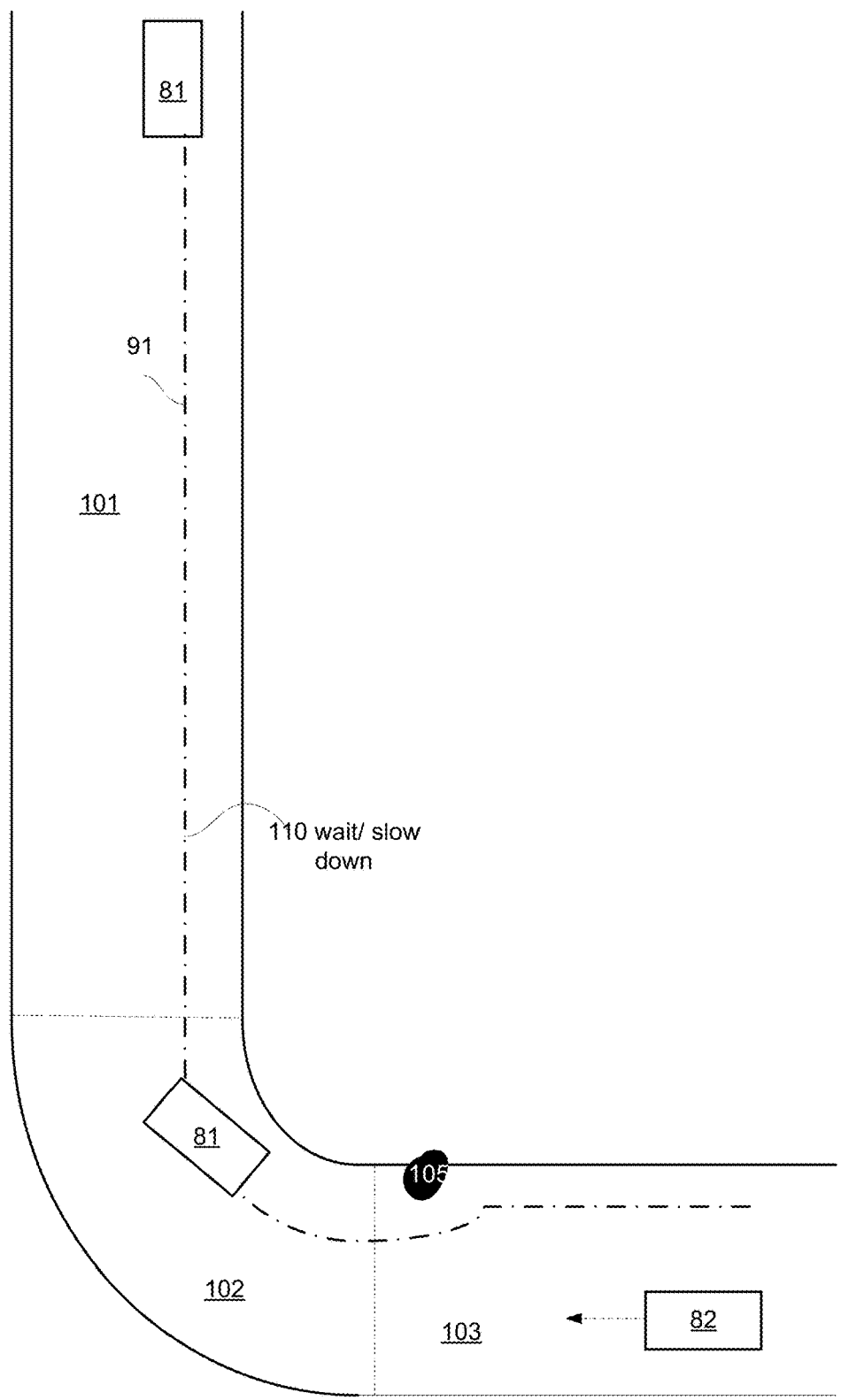
FIG. 6 is an example of a scenario.
Figure 7:
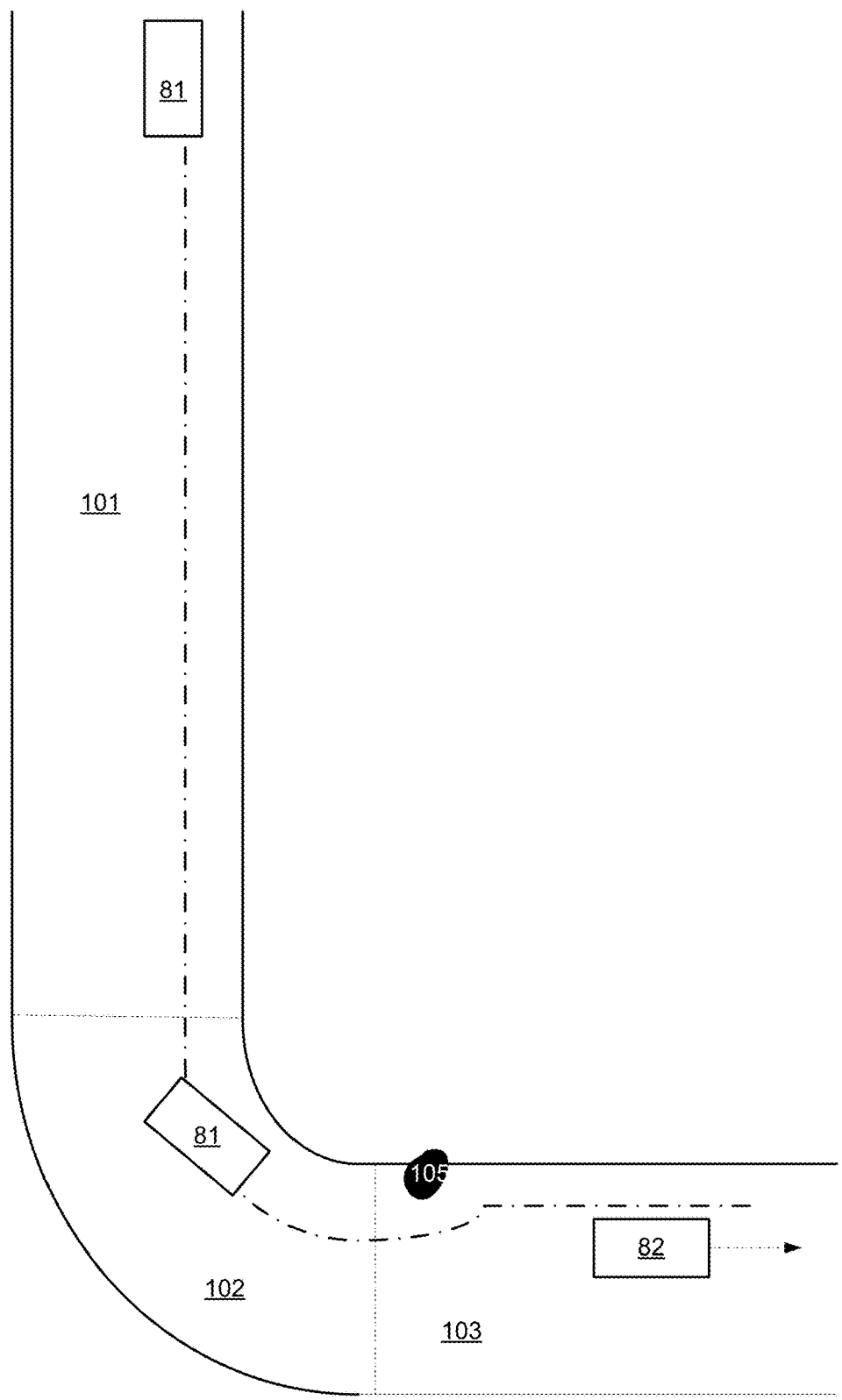
FIG. 7 is an example of a scenario.
Figure 8:
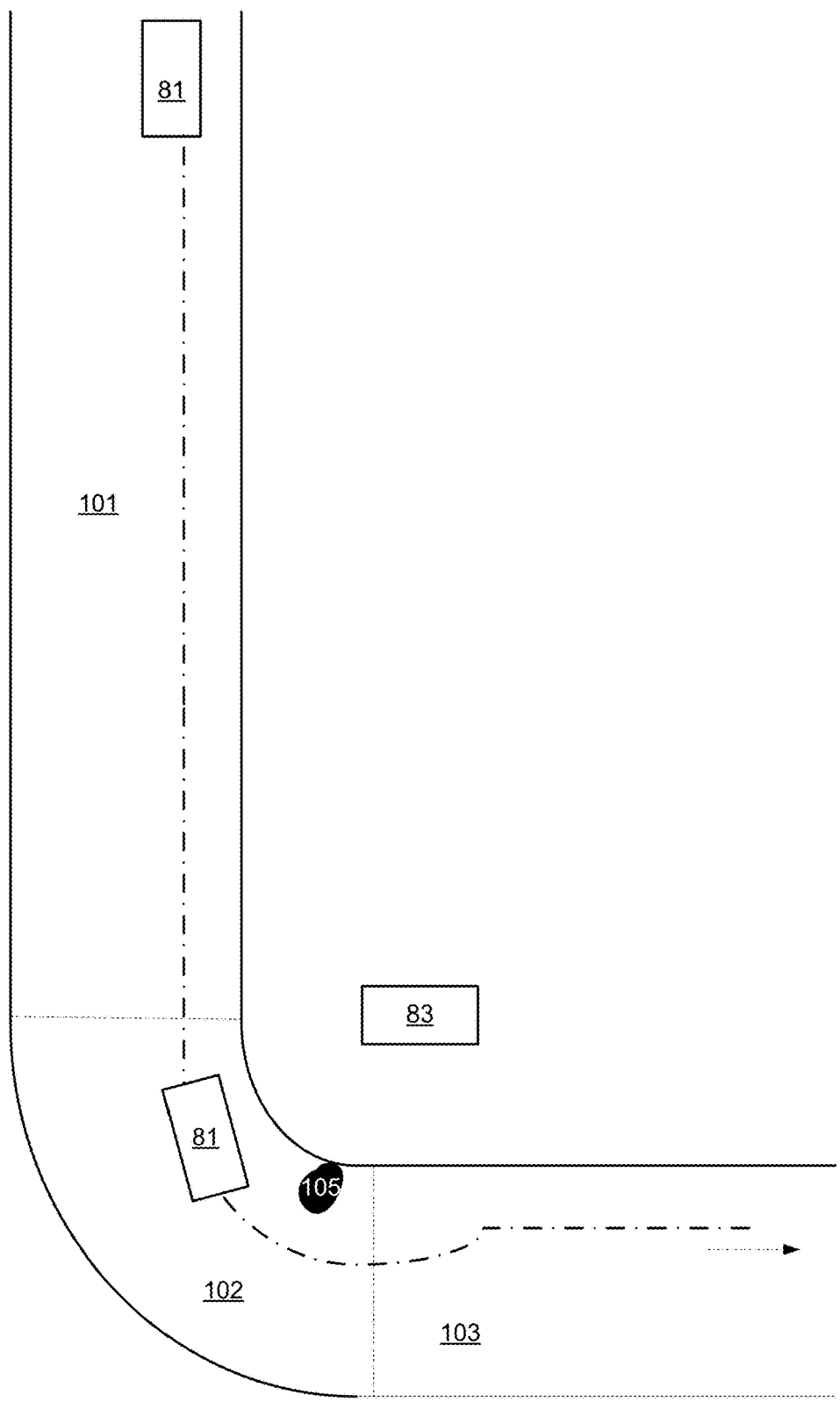
FIG. 8 is an example of a scenario.

In FIGS. 4, 5, 6 and 7 the obstacle 105 is located after the curve 102 while in FIG. 8 the obstacle is located after the curve. There may be any number of obstacles of one or more types including but not limited to rocks, pitholes, road irregularities, road stops, fallen trees, spilled oil, and the like.

Figure 4:
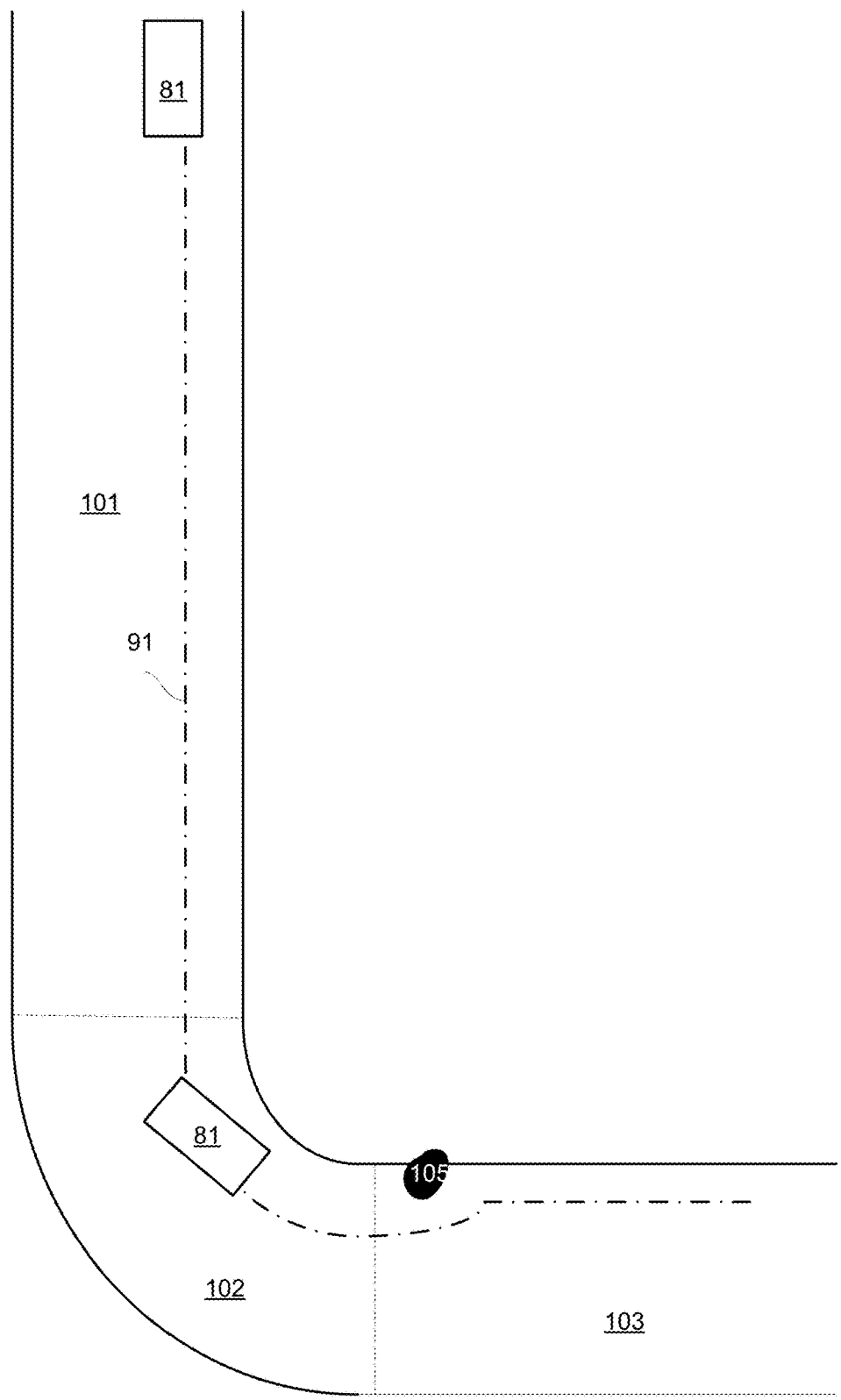
FIG. 4 is an example of a method.

In FIG. 4 the path 91 bypasses the obstacle.

Figure 5:
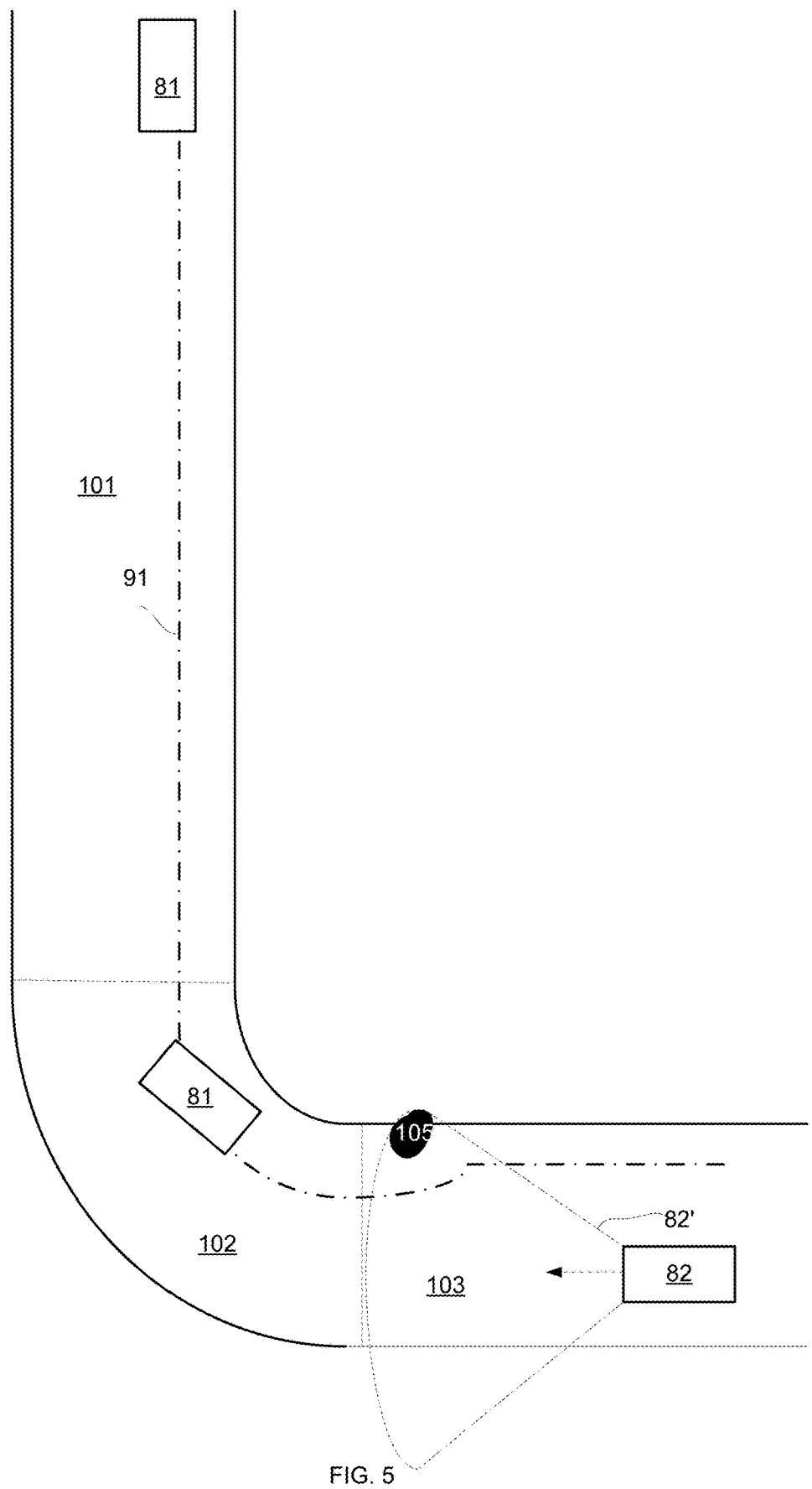
FIG. 5 is an example of a scenario.

In FIGS. 5, 6 and 7 information regarding the obstacle 105 may be provided by a second vehicle 82 (the obstacle is within the field of view 82' of second vehicle) to the first vehicle by direct or indirect communication—even before the first vehicle reaches the curve.

In FIGS. 5 and 6 the second vehicle 82 may propagate at a direction that opposite to the direction of propagation of the first vehicle—and the bypassing of the obstacle may reduce the lateral distance between the vehicle. Accordingly—the first vehicle may slow down or even stop (before entering the curve—see FIG. 6) and wait (event 110) till the second vehicle exits the curve—before entering the curve.

In FIG. 7 the second vehicle precedes the first vehicle and drives along the same direction.

In FIG. 8 information regarding the obstacle 105 may be provided by a device 83 that is not a vehicle (for example a sensor and to the first vehicle by direct or indirect communication—even before the first vehicle reaches the curve.

The terms "including", "comprising", "having", "consisting" and "consisting essentially of" are used in an interchangeable manner. For example—any method may include at least the steps included in the figures and/or in the specification, only the steps included in the figures and/or the specification. The same applies to the system.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one as or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an" The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements the mere fact that certain measures are recited in mutually different claims does not indicate that a combination of these measures cannot be used to advantage.

Any system, apparatus or device referred to this patent application includes at least one hardware component.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

Any combination of any component of any component and/or unit of system or module that is illustrated in any of the figures and/or specification and/or the claims may be provided.

Any combination of any system or module illustrated in any of the figures and/or specification and/or the claims may be provided.

Any combination of steps, operations and/or methods illustrated in any of the figures and/or specification and/or the claims may be provided.

Any combination of operations illustrated in any of the figures and/or specification and/or the claims may be provided.

Any combination of methods illustrated in any of the figures and/or specification and/or the claims may be provided.

What is claimed is:

1. A method for passing a curve, the method comprising:
   sensing, by a vehicle sensor of a vehicle, environment information regarding an environment of the vehicle;
   sensing at least one current propagation parameter of the vehicle;
   detecting, based on at least the environment information, (a) that the vehicle is about to reach the curve, (b) one or more first road conditions of a first road segment that precedes the curve;
   receiving, before reaching the curve using communication from another vehicle, one or more second road conditions of a second road segment that starts after a beginning of the curve; wherein the one or more second road conditions comprise an indication for an obstacle located after a beginning of the curve, (ii) are not visible to the vehicle before reaching the curve, and (iii) are within a field of view of the other device;
   determining, before the vehicle reaching the curve, one or more curve passing propagation parameters to be applied by the vehicle while passing the curve, wherein the determining is based, at least in part, on the one or more first road conditions, on the one or more second road conditions, on an obstacle bypass maneuver to be applied by the other vehicle while the other vehicle bypasses the obstacle, and on the at least one current propagation parameter; and
   responding to the determining.

2. The method according to claim 1, comprising receiving or generating a mapping between values of the one or more first road conditions, the one or more second road conditions, and values of the one or more curve passing propagation parameters; and wherein the determining is further responsive to the mapping, wherein the mapping is generated by a process that comprises determining which values of curve passing propagation parameters resulted in a successful passage of the curve, which values of curve passing propagation parameters results in accidents, and which values of curve passing propagation parameters resulted in near accidents.

3. The method according to claim 1, wherein the communication from the other vehicle is a direct communication from the other vehicle.

4. The method according to claim 1, wherein the determining, before reaching the curve of the one or more curve passing propagation parameters to be applied by the vehicle is responsive to an estimated change, resulting from the obstacle bypass maneuver, of a lateral distance between the vehicle and the other vehicle.

5. The method according to claim 1 wherein the one or more second road conditions comprise a quality of the second road segment, wherein the quality of the second road segment differs from materials located on the second road segment.

6. The method according to claim 1, wherein the vehicle and the other vehicle propagate at opposite directions, and wherein the determining, before reaching the curve of the one or more curve passing propagation parameters to be applied by the vehicle comprises determining to stop the vehicle before reaching the beginning of the curve and wait until the other vehicle passes the curve.

7. The method according to claim 1, wherein the determining is further responsive to a mapping between (a) values of the first one or more road conditions, values of the second one or more road conditions, and (b) values of the one or more curve passing propagation parameters, wherein the mapping is generated in response information about at least one reaction or at least one of a driver or a passenger, to a passage of one or more curves.

8. The method according to claim 1, wherein the responding comprises performing an advance driver assistance system (ADAS) operation that involves informing a driver of the vehicle about values of the one or more curve passing propagation parameters.

9. The method according to claim 1, wherein the responding comprises applying an autonomous vehicle pattern that involves applying the one or more curve passing propagation parameters.

10. The method according to claim 1, comprising transmitting the one or more first road conditions of a first road segment that precedes the curve, to another vehicle.

11. A non-transitory computer readable medium for passing a curve, the non-transitory computer readable medium that stores instructions for:
    sensing, by a vehicle sensor of a vehicle, environment information regarding an environment of the vehicle;
    sensing at least one current propagation parameter of the vehicle;
    detecting, based on at least the environment information, (a) that the vehicle is about to reach the curve, (b) one or more first road conditions of a first road segment that precedes the curve;
    receiving, before reaching the curve using communication from another vehicle, one or more second road conditions of a second road segment that starts after a beginning of the curve; wherein the one or more second road conditions (i) comprise an indication for an obstacle located after a beginning of the curve, (ii) are not visible to the vehicle before reaching the curve, and (iii) are within a field of view of the other device;
    determining, before the vehicle reaching the curve, one or more curve passing propagation parameters to be applied by the vehicle while passing the curve, wherein the determining is based, at least in part, on the one or more first road conditions, on the one or more second road conditions, on an obstacle bypass maneuver to be applied by the other vehicle while the other vehicle bypasses the obstacle, and on the at least one current propagation parameter;
    responding to the determining.

12. The non-transitory computer readable medium according to claim 11, that stores instructions for receiving or generating a mapping between values of the one or more first road conditions, one or more second road conditions, and values of the one or more curve passing propagation parameters; and wherein the determining is further responsive to the mapping; wherein the mapping is generated by a process that comprises determining which values of curve passing propagation parameters resulted in a successful passage of the curve, which values of curve passing propagation parameters results in accidents, and which values of curve passing propagation parameters resulted in near accidents.

13. The non-transitory computer readable medium according to claim 11 wherein the one or more second road conditions comprise a smoothness of the second road segment.

14. The non-transitory computer readable medium according to claim 11, wherein the determining, before reaching the curve of the one or more curve passing propagation parameters to be applied by the vehicle is responsive to an estimated change, resulting from the obstacle bypass maneuver, of a lateral distance between the vehicle and the other vehicle.

15. The non-transitory computer readable medium according to claim 11, wherein the one or more second road conditions comprise a quality of the second road segment wherein the quality of the second road segment differs from materials located on the second road segment.

16. The non-transitory computer readable medium according to claim 11, wherein the vehicle and the other vehicle propagate at opposite directions, and wherein the determining, before reaching the curve of the one or more curve passing propagation parameters to be applied by the vehicle comprises determining to stop the vehicle before reaching the beginning of the curve and wait until the other vehicle passes the curve.

17. The non-transitory computer readable medium according to claim 11, wherein the determining is further responsive to a mapping between (a) values of the first one or more road conditions, values of the second one or more road conditions, and (b) values of the one or more curve passing propagation parameters; wherein the mapping is generated in response information about at least one reaction or at least one of a driver or a passenger, to a passage of one or more curves.

18. The non-transitory computer readable medium according to claim 11, wherein the responding comprises performing an advance driver assistance system (ADAS) operation that involves informing a driver of the vehicle about values of the one or more curve passing propagation parameters.

19. The non-transitory computer readable medium according to claim 11, wherein the responding comprises applying an autonomous vehicle pattern that involves applying the one or more curve passing propagation parameters.

20. The non-transitory computer readable medium according to claim 11, that stores instructions for transmitting the one or more first road conditions of a first road segment that precedes the curve to another vehicle.

21. The method according to claim 1 wherein the one or more second road conditions comprises an indication of whether an upper surface of the second road segment is scrapped.

22. The method according to claim 1, wherein the responding comprises performing an advance driver assistance system (ADAS) operation that involves taking control of the vehicle from the driver, wherein the taking over the control differs from just automatically slowing down the vehicle.

23. The method according to claim 1, wherein the responding comprises performing an advance driver assistance system (ADAS) operation that involves allowing the driver to control the vehicle while autonomously limiting at least one of a maximal acceleration a limiting maximal velocity.

* * * * *